(12) United States Patent
Nakanuma

(10) Patent No.: US 10,025,064 B2
(45) Date of Patent: Jul. 17, 2018

(54) OPTICAL IMAGING SYSTEM, CAMERA, AND IN-VEHICLE CAMERA

(71) Applicant: Hiroshi Nakanuma, Kanagawa (JP)

(72) Inventor: Hiroshi Nakanuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 193 days.

(21) Appl. No.: 14/689,238

(22) Filed: Apr. 17, 2015

(65) Prior Publication Data

US 2015/0362699 A1 Dec. 17, 2015

(30) Foreign Application Priority Data

Jun. 13, 2014 (JP) ................................ 2014-122927

(51) Int. Cl.
  *G02B 13/00* (2006.01)
  *G02B 13/04* (2006.01)
  (Continued)

(52) U.S. Cl.
  CPC ......... *G02B 13/0015* (2013.01); *G02B 13/04* (2013.01); *G02B 15/177* (2013.01); *H04N 5/2254* (2013.01)

(58) Field of Classification Search
  CPC .. G02B 13/0015; G02B 13/04; G02B 15/177; G02B 9/62; G02B 9/64; G02B 9/04; G02B 9/06; G02B 9/08; G02B 9/10; G02B 9/12; G02B 9/14; G02B 9/16; G02B 9/18; G02B 9/20; G02B 9/34; G02B 9/36; G02B 9/60; H04N 5/2254
  (Continued)

(56) References Cited

U.S. PATENT DOCUMENTS

| 2003/0210471 A1 | 11/2003 | Mihara et al. |
| 2007/0201140 A1 | 8/2007 | Kato |

(Continued)

FOREIGN PATENT DOCUMENTS

| CN | 101526665 A | 9/2009 |
| JP | 2007-225959 | 9/2007 |

(Continued)

OTHER PUBLICATIONS

Shirasaki, JP2012220741A, machine translation.*

(Continued)

*Primary Examiner* — Bumsuk Won
*Assistant Examiner* — Wen Huang
(74) *Attorney, Agent, or Firm* — Oblon, McClelland, Maier & Neustadt, L.L.P.

(57) ABSTRACT

An optical imaging system having a single focus includes a negative first lens group, an aperture stop, and a positive second lens group arranged in order from an object side. The first lens group includes a positive first front lens group including a positive single lens and a negative first rear lens group including a negative meniscus lens and at least one positive lens, arranged in order from the object side. The second lens group includes a positive second front lens group including a cemented lens of a negative lens and a positive lens and a positive second rear lens group including at least one positive lens, arranged in order from the object side. All of the lenses of the optical imaging system are spherical glass lenses.

9 Claims, 10 Drawing Sheets

(51) Int. Cl.
*G02B 15/177* (2006.01)
*H04N 5/225* (2006.01)

(58) Field of Classification Search
USPC ........ 359/713–717, 750, 751–758, 763–764,
359/784, 785, 793–795, 771–774, 776,
359/680, 682, 749
See application file for complete search history.

(56) References Cited

U.S. PATENT DOCUMENTS

2009/0225444 A1  9/2009  Yamamoto
2014/0071026 A1  3/2014  Hatashita et al.

FOREIGN PATENT DOCUMENTS

JP     2012-220741    11/2012
JP        5418745     11/2013

OTHER PUBLICATIONS

Extended European Search Report dated Aug. 27, 2015 in Patent Application No. 15165251.8.
Chinese Office Action issued in Application No. 201510323726.3 dated Mar. 20, 2017 (w/ English translation).

* cited by examiner

OPTICAL IMAGING SYSTEM, CAMERA, AND IN-VEHICLE CAMERA

CROSS REFERENCE TO RELATED APPLICATION

The present application is based on and claims priority from Japanese Patent Application No. 2014-122927, filed on Jun. 13, 2014, the disclosure of which is hereby incorporated by reference in its entirety.

BACKGROUND OF THE INVENTION

Field of the Invention

The present invention relate to an improvement in a unifocal optical imaging system used in various kinds of camera to form an image of a subject, especially an optical imaging system of an imaging device using an electric imaging unit such as a digital camera or a digital video camera. It also relates to a camera and an in-vehicle camera incorporating such an optical imaging system.

Description of the Related Art

Among imaging devices including an optical imaging system and an area sensor, a security camera, a monitoring camera for a manufacturing line, and an in-vehicle camera have been increased in demand. These cameras are used for sensing a target object. For example, an in-vehicle camera is required to recognize the position of a running vehicle or the state of a road surface. In view of this, an image forming lens of such a camera needs to exert high resolution for the purpose of recognizing relatively small objects or precisely observing a situation in a relatively far location. Further, in order to accurately acquire information of a target object including size and shape, the image forming lens with a wide angle of view is required to optically correct distortion appropriately. In addition to high resolution and low distortion, it has to be a large diameter lens with small F-number to be able to properly recognize an object even in a dark ambience as night. In general an imaging device for sensing is preferably small in size to be unnoticeable. Moreover, for in-vehicle or monitoring use, an optical imaging system is preferably resistant to a thermal change or a change in usage environment since it is likely used outside.

Japanese Patent No. 4667269 (Reference 1) and No. 5418745 (Reference 2), and Japanese Laid-open Patent Application Publication No. 2012-220741 (Reference 3) disclose retrofocus imaging lenses for sensing in which filters including a lowpass filter and an infrared cut filter are arranged in a space between an optical system and an image sensor. However, the imaging lens in Reference 1 does not secure sufficient F-number despite its good lens performance and low distortion. In addition, it cannot acquire sufficient angle of view with a small-size sensor due to a long focal length and it is not sufficiently compact. Likewise, the imaging lens in Reference 2 realizes low distortion but cannot acquire sufficient angle of view with a small-size sensor due to a long focal length and it is not sufficiently compact either. The imaging lens in Reference 3 is compact-size and has excellent environment resistance; however, it cannot secure back focusing and realize low distortion sufficiently.

SUMMARY OF THE INVENTION

The present invention aims to provide a novel optical imaging system which can achieve low distortion.

According to one embodiment an optical imaging system having a single focus includes a negative first lens group, an aperture stop, and a positive second lens group arranged in order from an object side. The first lens group includes a positive first front lens group including a positive single lens and a negative first rear lens group including a negative meniscus lens and at least one positive lens, arranged in order from the object side. The second lens group includes a positive second front lens group including a cemented lens of a negative lens and a positive lens and a positive second rear lens group including at least one positive lens, arranged in order from the object side. All of the lenses of the optical imaging system are spherical glass lenses.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENT

Figure 1:
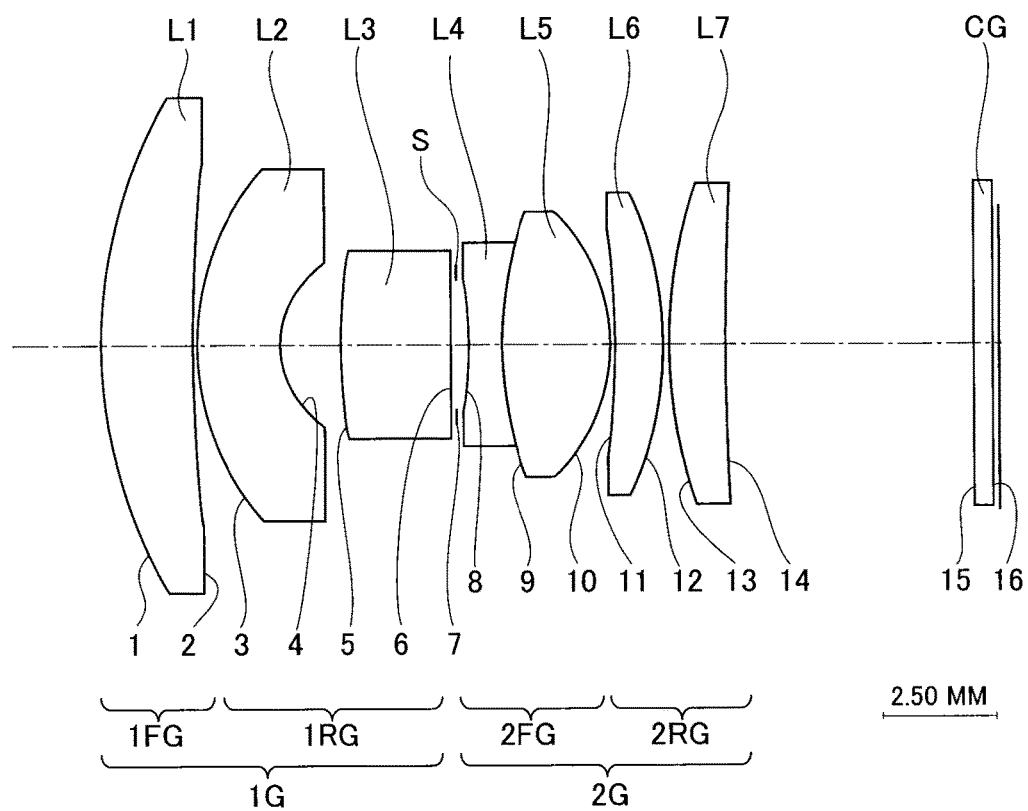
FIG. 1 shows the arrangement of an optical imaging system according to a first embodiment.

Hereinafter, embodiments of an optical imaging system, a camera, and an in-vehicle camera will be described in detail with reference to the accompanying drawings. Wherever possible, the same reference numbers will be used throughout the drawings to refer to the same or like parts.

First, the principle of an optical imaging system according to one embodiment is described. The optical imaging system is used in an imaging device for sensing such as an in-vehicle camera, security camera, or monitoring camera for manufacturing line. The optical imaging system is a single-focus imaging system and includes a negative first lens group, an aperture stop, and a positive second lens group arranged in order from an object side. The first lens group includes a positive first front lens group and a negative first rear lens group arranged in order from the object side. The first front lens group includes a single lens having positive power and the first rear lens group includes a meniscus lens and at least one positive lens and has negative power. The second lens group includes a positive second front lens group and a positive second rear lens group arranged in order from the object side. The second front lens group includes a cemented lens of a negative lens and a positive lens from the object side. The second rear lens group includes at least one positive lens. All of the lenses of the optical imaging system are spherical glass lenses.

Preferably, the first lens group includes a positive lens having a convex surface on the object side, a negative meniscus lens having a convex surface on the object side, and a positive lens having a convex surface on the object side, arranged in order from the object side. The first lens group is configured to satisfy the following conditions:

$$2.5 < f1F/f < 7.1 \tag{1}$$

$$-3.7 < f1R/f < -0.8 \tag{2}$$

where f is a focal length of the entire system relative to a d-line, f1F is a focal length of the first front lens group, and f1R is a focal length of the first rear lens group.

Preferably, the cemented lens of the second front lens group has a concave surface on the object side and a convex surface on an image side, and the second front lens group is configured to satisfy the following condition:

$$2.0 < f2F/f < 12.6 \tag{3}$$

where f is a focal length of the entire system relative to a d-line and f2F is a focal length of the second front lens group.

Preferably, the second rear lens group includes a positive meniscus lens having a convex surface on the image side and a positive lens having a convex surface on the object side.

Further, preferably, the optical imaging system is configured to satisfy the following condition:

$$2.9 < L/f < 4.6 \tag{4}$$

where f is a focal length of the entire system relative to a d-line and L is a distance between a surface of the lens of the first lens group on the object side and an image plane. Note that the distance L is not an air conversion length but an actual length. Further, a camera comprising the optical imaging system can be provided. The camera can convert an image of a subject to digital information. The optical imaging system is a retrofocus type.

In general it is difficult for a retrofocus optical imaging system with a wide angle of view and a large diameter to correct various kinds of aberration. Relative to an aperture stop, a front lens group having negative power is placed on an object side and a rear lens group having positive power is placed on an image side. The overall power of the system is thus asymmetric. Because of this, distortion and chromatic aberration of magnification are likely to occur. Further, the front lens group is set to have large negative refractive power in order to achieve a long back focus, resulting in a large amount of aberration which is difficult to properly correct in a balanced manner. The optical imaging system according to one embodiment can achieve not only a large diameter and a wide angle of view but also downsizing and a low distortion. By configuring the first lens group arranged on the object side to have negative power, a compact-size, wide angle of view optical imaging system can be realized. Distortion can be properly corrected by the first front and rear lens groups. The single positive lens as the first front lens group is arranged closest to an object for the purpose of balancing distortion of the first lens group. The first rear lens group having negative refractive power works to correct spherical aberration arising from a large lens diameter. In the first rear lens group comprising a negative lens and a positive lens, the positive lens in a larger thickness is arranged adjacent to the aperture stop to correct distortion.

The second lens group has positive refractive power as a whole. The second front lens group functions to correct spherical aberration and chromatic aberration and includes one or more negative lenses causing negative spherical aberration for the purpose of correcting spherical aberration of the entire system without affecting off-axial aberration. The positive cemented lens of the second front lens group works to correct axial chromatic aberration. The second rear lens group has positive refractive power to secure exit pupil distance and correct aberrations caused by the lens groups closer to the object than the second rear lens group. Also, the positive meniscus lens having a convex surface on the image side can reduce spherical aberration. The second rear lens group interacts on aberrations with the negative lenses of the first lens group and corrects off-axial aberration appropriately. Thus, the optical imaging system as configured above can correct various kinds of aberration properly to secure good image property.

Further, the optical imaging system comprising glass lenses is unsusceptible to environmental changes and therefor suitable for in-vehicle use. Due to having a large linear expansion coefficient, the surfaces of plastic lenses may be deformed in high ambient temperature to be unable to satisfy desired optical performance. Degradation such as coat crack is also likely to occur on the lens surfaces. All of the lenses of the optical imaging system according to the present invention are made from glass so that lens deformation or expansion can be small even in high temperature. This optical imaging system is highly reliable in terms of changes in usage environment. Moreover, the lenses of the imaging lens are preferably arranged to satisfy the following conditions:

$$2.5 < f1F/f < 7.1 \tag{1}$$

$$-3.7 < f1R/f < -0.8 \tag{2}$$

$$2.0 < f2F/f < 12.6 \tag{3}$$

$$2.9 < L/f < 4.6 \tag{4}$$

The condition (1) defines an appropriate range of the positive power of the first front lens group relative to the focal length of the entire optical imaging system. With f1F/f of the condition (1) exceeding the upper limit value, the positive power of the first front lens group is relatively weak and astigmatism and distortion of the optical imaging system are likely to increase. Also, the diameter of the positive lens of the first front lens group is likely increased, which makes it difficult to shorten the total length of the optical imaging system. Too large positive power of the first lens group hinders securing sufficient back focus. With f1F/f of the condition (1) below the lower limit value, the positive power of the first front lens group is relatively too strong and astigmatism and distortion of the optical imaging system cannot be corrected sufficiently. If the negative power of the first rear group is relatively too large, spherical aberration, image curvature, and distortion of the optical imaging system cannot be sufficiently corrected although back focus can be secured adequately.

The condition (2) defines a range of the negative power of the first rear lens group relative to the focal length of the entire optical imaging system. With f1R/f exceeding the upper limit value, the negative power of the first rear lens group is relatively too large, causing increased spherical aberration and distortion. Further, the balance of power between the first front and rear lens groups is disrupted so that distortion is increased. With f1R/f below the lower limit value, the negative power of the first rear lens group is relatively too weak and the balance of aberration is disrupted, increasing spherical aberration and distortion. Meanwhile, the second front lens group includes the cemented lens of the negative lens having a concave surface on the object side and the positive lens having a convex surface on the image side, and has positive power. The positive lens of the cemented lens having larger power than the negative lens is a glass material with low dispersion and large Abbe number. The negative lens is a glass material with high dispersion and small Abbe number. Thereby, the second front lens group can correct axial chromatic aberration as a whole.

The condition (3) defines an appropriate range of the positive power of the second front lens group relative to the focal length of the entire optical imaging system. With f2F/f of the condition (3) below the lower limit value, the positive power of the second front lens group is relatively too strong and the balance of aberrations of the entire optical imaging system is disrupted, causing increased spherical aberration, axial chromatic aberration and chromatic aberration of magnification. As a result, aberration correction becomes unfeasible. With f2F/f of the condition (3) exceeding the upper limit value, the positive power of the second front lens group is relatively too weak and the balance of aberrations of the entire optical imaging system is also disrupted. The positive power of the second rear lens group is increased so as to balance aberrations of the second lens group, increasing spherical aberration, axial chromatic aberration, and chromatic aberration of magnification. Moreover, the second rear lens group decreases the property to adjust exit pupil and cannot secure sufficient back focus.

The condition (4) defines an appropriate range of the total length of the optical imaging system from a lens surface of the first lens group closest to the object to the image plane relative to the total focal length. With L/f of the condition (4) exceeding the upper limit value, aberrations can be easily corrected. However, it is difficult to correct chromatic aberration and lateral aberration. Having a long total length, the optical imaging system cannot be downsized. With L/f of the condition (4) below the lower limit value, the refractive power of the optical imaging system is too increased, making it difficult to correct spherical aberration and distortion. Thus, desired image performance cannot be achieved.

Thus, the optical imaging system can realize a compact size, good image property, a half angle of view of about 30 degrees, a large diameter of F-number of about 2.0, and low distortion of about 1.0%, which will become obvious from the following examples.

Next, four examples (specific values) of an image forming lens as the optical imaging system according to first to fourth embodiments are described, referring to FIG. 1 to FIG. 4, respectively.

In the second and third embodiments a parallel plate F is a filter such as optical lowpass filter or infrared cut filter and disposed on the image plane side of the second rear lens group. In the first and fourth embodiments a cover glass or sealing glass CG for a light receiving element such as CMOS sensor is placed immediately before the imaging plane. In the first to fourth embodiments aberrations are corrected at a high level.

In the first to fourth embodiments codes used are defined as follows.
f: focal length of the entire optical system
Fno: F-number
ω: half angle of view
γ: curvature radius
d: surface interval
Nd: refractive index
vd: Abbe number First Embodiment FIG. 1 shows the optical arrangement of the image forming lens according to the first embodiment. The image forming lens in FIG. 1 includes first to third lenses L1 to L3, an aperture stop S, and fourth to seventh lenses L4 to L7 arranged in order from an object side to an image plane side. The fourth and fifth lenses L4, L5 are a cemented lens. The image forming lens is comprised of six groups and seven lenses. The first to third lenses L1 to L3 are a first lens group 1G. The fourth to seventh lenses L4 to L7 are a second lens group 2G. The first lens L1 is a first front lens group 1FG having positive refractive power. The second and third lenses L2, L3 are a first rear lens group 1RG having negative refractive power. The fourth and fifth lenses L4, L5 are a second front lens group 2FG having positive refractive power. The sixth and seventh lenses L6, L7 are a second rear lens group 2RG having positive refractive power.

Thus, the first front and rear lens groups 1FG, 1RG, aperture stop S, and the second front lens groups 2FG, 2RG are arranged in order from the object side to the image plane side. Specifically, in the first lens group 1G the first lens L1 is a positive meniscus lens having a convex surface on the object side, the second lens L2 is a negative meniscus lens having a convex surface on the object side, and the third lens L3 is a positive meniscus lens having a convex surface on the object side, to exert negative refractive power. The aperture stop S is placed between the first and second lens groups 1G and 2G. In the second lens group 2G the fourth lens L4 is a negative bi-concave lens having a larger curvature on the image plane side than the object side, the fifth lens L5 is a positive bi-convex lens having a larger curvature on the image plane side than the object side, the sixth lens L6 is a positive meniscus lens having a convex surface on the image plane side, and the seventh lens L7 is a positive meniscus lens having a convex surface on the object side, to exert positive refractive power.

The fourth and fifth lenses L4 and L5 are a cemented lens attached closely to each other. A cover glass CG is provided behind the second lens group 2G. FIG. 5 shows curves of spherical aberration, astigmatism, distortion, and coma aberration on d-line and g-line when the optical imaging system according to the first embodiment focuses on an object at infinity. In FIGS. 5 to 8 the broken line in the spherical aberration indicates a sine condition, and in the astigmatism the solid line indicates sagittal and the broken line indicates meridional. In FIGS. 1 to 4 the surfaces of the optical elements are given numbers. Note that the same numeric codes are used throughout the first to fourth embodiments for the sake of simplicity. According to the first embodiment the focal length f, F-number Fno, and half angle of view ω are f=5.70, Fno=1.9, ω=27.8, respectively. The optical properties of the respective optical elements such as curvature radius γ of lens surface, interval d between neighboring lens surfaces, refractive index Nd, and Abbe number vd are shown in the following Table 1.

TABLE 1

| FACE NUMBER | r | d | Nd | vd |
|---|---|---|---|---|
| 1 | 10.630 | 1.97 | 1.7234 | 38.0 |
| 2 | 37.627 | 0.10 | | |
| 3 | 5.730 | 1.81 | 1.7292 | 54.7 |
| 4 | 2.128 | 1.31 | | |
| 5 | 12.540 | 2.40 | 1.8503 | 32.3 |
| 6 | 194.620 | 0.10 | | |
| 7 | — | 0.30 | | |
| 8 | −8.575 | 0.70 | 1.8081 | 22.8 |
| 9 | 7.971 | 2.38 | 1.5952 | 67.7 |
| 10 | −3.900 | 0.10 | | |
| 11 | −18.640 | 1.05 | 1.8040 | 46.6 |
| 12 | −7.350 | 0.10 | | |
| 13 | 10.452 | 1.19 | 1.7200 | 50.2 |
| 14 | 42.934 | 5.53 | | |
| 15 | ∞ | 0.40 | 1.5163 | 64.1 |
| 16 | ∞ | 0.15 | | |

The specific values of the above conditions (1) to (4) are as follows:
Condition (1): f1F/f = 3.48
Condition (2): f1R/f = −1.73
Condition (3): f2F/f = 2.74
Condition (4): L/f = 3.42

These values are within the respective ranges defined in the conditions.

Second Embodiment

Figure 2:
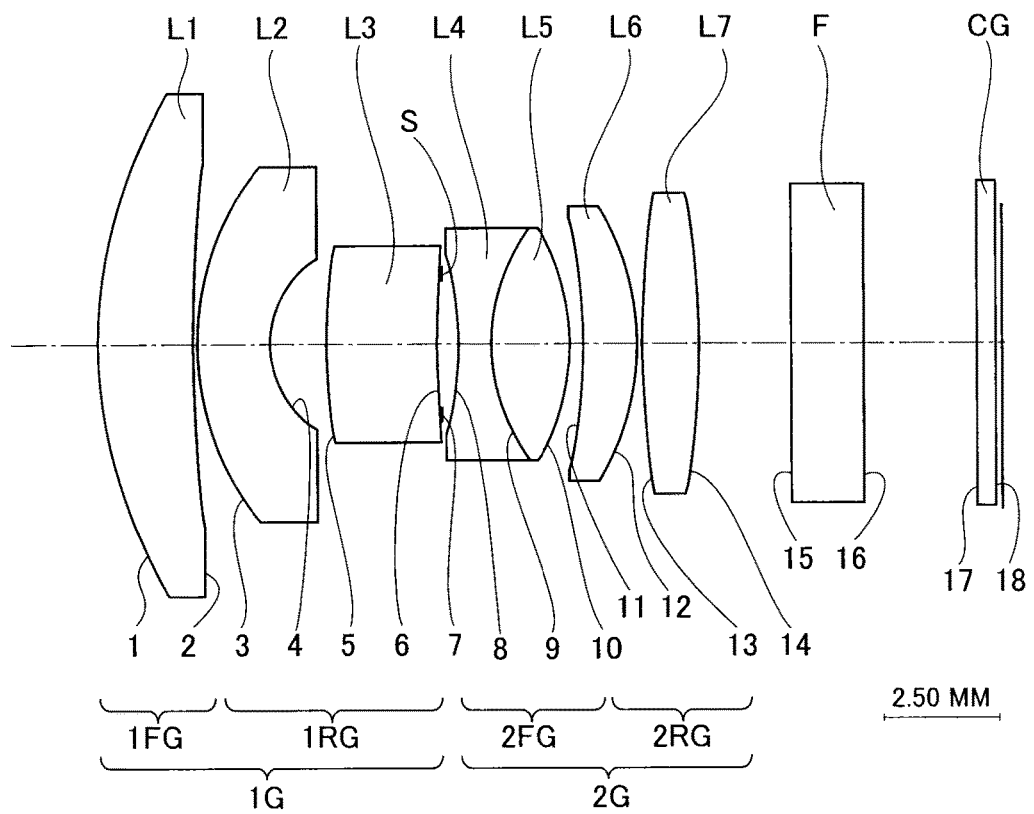
FIG. 2 shows the arrangement of an optical imaging system according to a second embodiment.

FIG. 2 shows the optical arrangement of the image forming lens according to the second embodiment. The image forming lens in FIG. 2 includes first to third lenses L1 to L3, an aperture stop S, and fourth to seventh lenses L4 to L7 arranged in order from an object side to an image plane side. The fourth and fifth lenses L4, L5 are a cemented lens. The image forming lens is comprised of six groups and seven lenses. The first to third lenses L1 to L3 are a first lens group 1G. The fourth to seventh lenses L4 to L7 are a second lens group 2G. The first lens L1 is a first front lens group 1FG having positive refractive power. The second and third lenses L2, L3 are a first rear lens group 1RG having negative refractive power. The fourth and fifth lenses L4, L5 are a second front lens group 2FG having positive refractive power. The sixth and seventh lenses L6, L7 are a second rear lens group 2RG having positive refractive power.

Thus, the first front and rear lens groups 1FG, 1RG, aperture stop S, and the second front and rear lens groups 2FG, 2RG are arranged in order from the object side to the image plane side. In the first lens group 1G the first lens L1 is a positive meniscus lens having a convex surface on the object side, the second lens L2 having a negative meniscus lens having a convex surface on the object side, and the third lens L3 is a positive meniscus lens having a convex surface on the object side, to exert negative refractive power. The aperture stop S is disposed between the first and second lens groups 1G and 2G. In the second lens group 2G the fourth lens L4 is a negative bi-concave lens having a larger curvature on the image plane side than the object side, the fifth lens L5 is a positive bi-convex lens having a larger curvature on the object side than the image plane side, the sixth lens L6 is a positive meniscus lens having a convex surface on the image plane side, and the seventh lens L7 is a positive bi-convex lens having a larger curvature on the image plane side than the object side, to exert positive refractive power.

Figure 6:
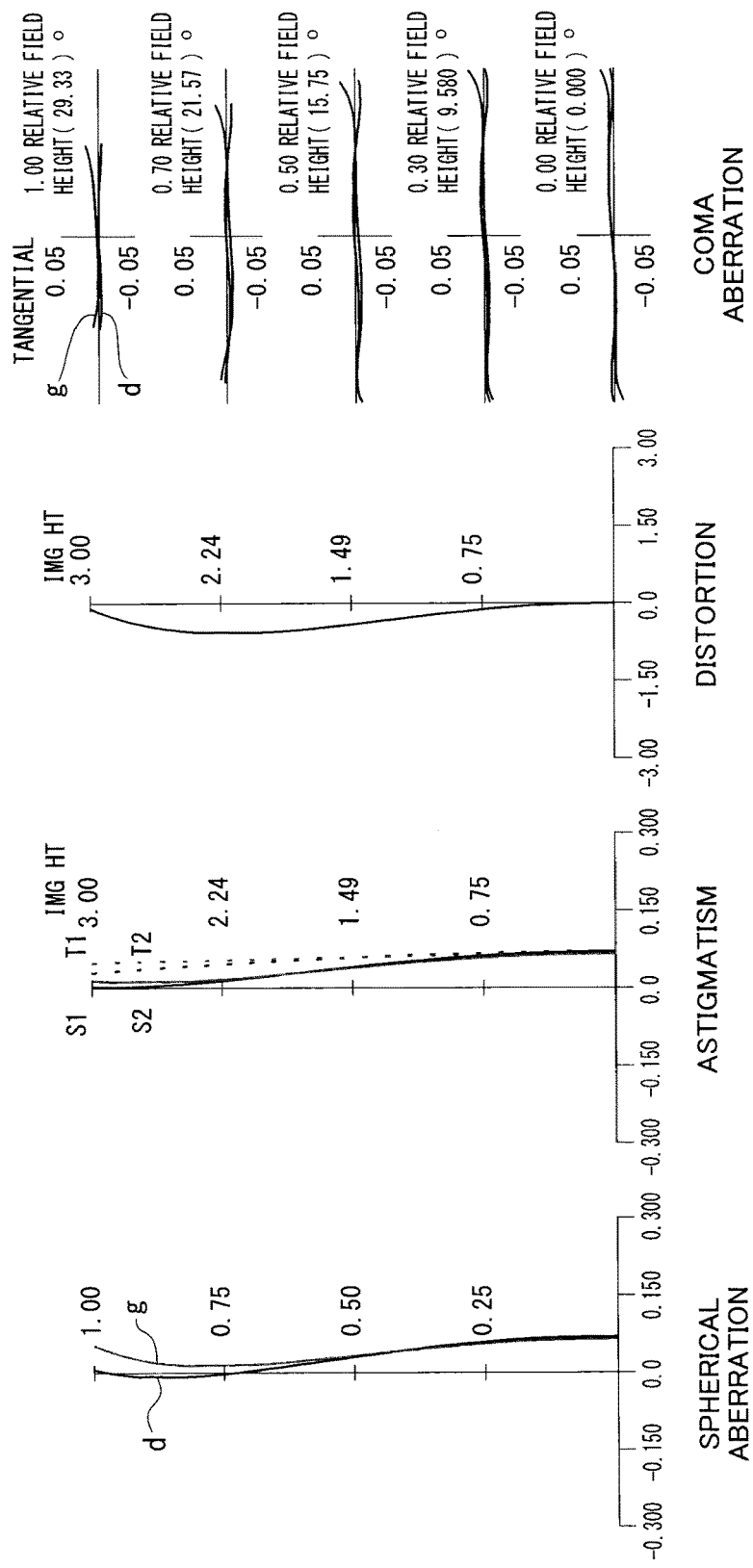
FIG. 6 shows aberration curves of the optical imaging system in FIG. 2 according to the second embodiment.

The fourth and fifth lenses L4 and L5 are a cemented lens closely adhered to each other. A filter F as parallel plate is provided behind the second lens group 2G and a cover glass CG is provided on the image plane side of the filter F. FIG. 6 shows curves of spherical aberration, astigmatism, distortion, and coma aberration on d-line and g-line when the optical imaging system according to the second embodiment focuses on an object at infinity. According to the second embodiment the focal length f, F-number Fno, and half angle of view ω are f=5.36, Fno=1.9, ω=29.4, respectively. The optical properties of the respective optical elements such as curvature radius γ of lens surface, interval d between neighboring lens surfaces, refractive index Nd, and Abbe number vd are shown in the following Table 2.

TABLE 2

| FACE NUMBER | r | d | Nd | vd |
|---|---|---|---|---|
| 1 | 10.137 | 2.00 | 1.7620 | 40.1 |
| 2 | 32.800 | 0.10 | | |
| 3 | 5.900 | 1.57 | 1.7292 | 54.7 |
| 4 | 2.133 | 1.18 | | |
| 5 | 10.350 | 2.40 | 1.7215 | 29.2 |
| 6 | 25.000 | 0.10 | | |
| 7 | — | 0.35 | | |
| 8 | −7.232 | 0.70 | 1.7552 | 27.5 |
| 9 | 4.025 | 1.69 | 1.7130 | 53.9 |
| 10 | −4.700 | 0.28 | | |
| 11 | −12.552 | 1.15 | 1.7725 | 49.6 |
| 12 | −5.517 | 0.10 | | |
| 13 | 21.000 | 1.22 | 1.6779 | 55.3 |
| 14 | −18.000 | 1.97 | | |
| 15 | ∞ | 1.54 | 1.5163 | 64.1 |
| 16 | ∞ | 2.40 | | |
| 17 | ∞ | 0.40 | 1.5163 | 64.1 |
| 18 | ∞ | 0.13 | | |

The specific values of the above conditions (1) to (4) are as follows:
Condition (1): f1F/f = 3.46
Condition (2): f1R/f = −1.34
Condition (3): f2F/f = 3.11
Condition (4): L/f = 3.59

These values are within the respective ranges defined in the conditions.

Third Embodiment

Figure 3:
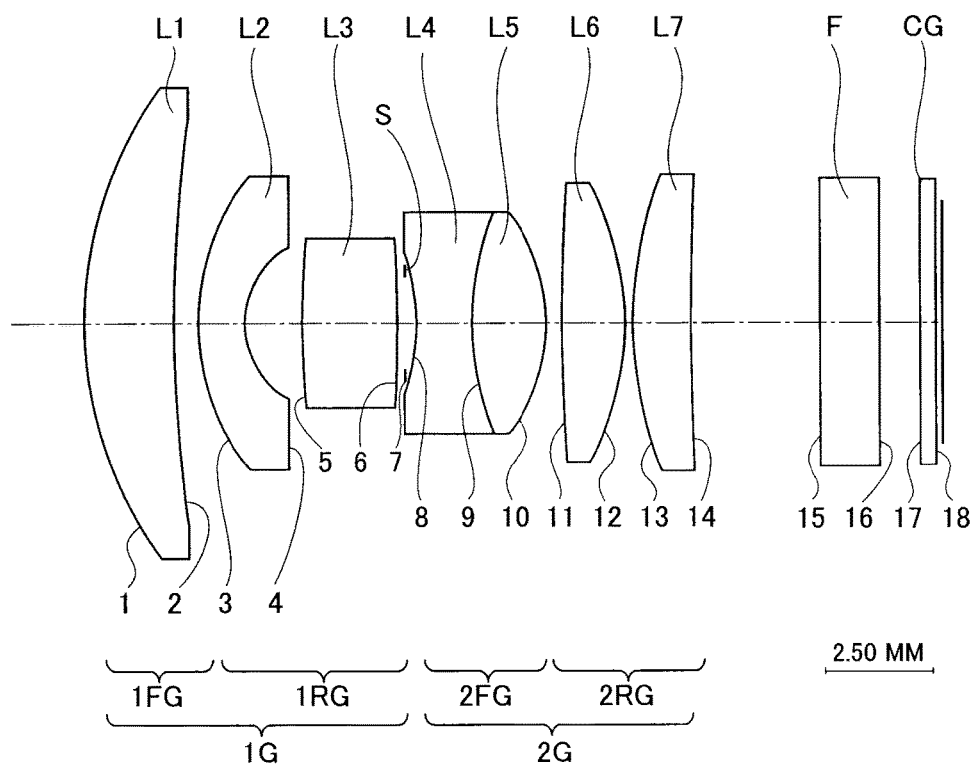
FIG. 3 shows the arrangement of an optical imaging system according to a third embodiment.

FIG. 3 shows the optical arrangement of the image forming lens according to the third embodiment. The image forming lens in FIG. 3 includes first to third lenses L1 to L3, an aperture stop S, and fourth to seventh lenses L4 to L7 arranged in order from an object side to an image plane side. The fourth and fifth lenses L4, L5 are a cemented lens. The image forming lens is comprised of six groups and seven lenses. The first to third lenses L1 to L3 are a first lens group 1G. The fourth to seventh lenses L4 to L7 are a second lens group 2G. The first lens L1 is a first front lens group 1FG having positive refractive power. The second and third lenses L2, L3 are a first rear lens group 1RG having negative refractive power. The fourth and fifth lenses L4, L5 are a second front lens group 2FG having positive refractive power. The sixth and seventh lenses L6, L7 are a second rear lens group 2RG having positive refractive power.

Thus, the first front and rear lens groups 1FG, 1RG, aperture stop S, and the second front and rear lens groups 2FG, 2RG are arranged in order from the object side to the image plane side. In the first lens group 1G the first lens L1 is a positive meniscus lens having a convex surface on the object side, the second lens L2 having a negative meniscus lens having a convex surface on the object side, and the third lens L3 is a positive bi-convex lens having a larger curvature on the object side than the image plane side, to exert negative refractive power. The aperture stop S is disposed between the first and second lens groups 1G and 2G. In the second lens group 2G the fourth lens L4 is a negative bi-concave lens having a larger curvature on the object side than the image plane side, the fifth lens L5 is a positive bi-convex lens having a larger curvature on the image plane side than the object side, the sixth lens L6 is a positive bi-convex lens having a larger curvature on the image plane side than the object side, and the seventh lens L7 is a positive meniscus lens having a convex surface on the object side, to exert positive refractive power.

Figure 7:
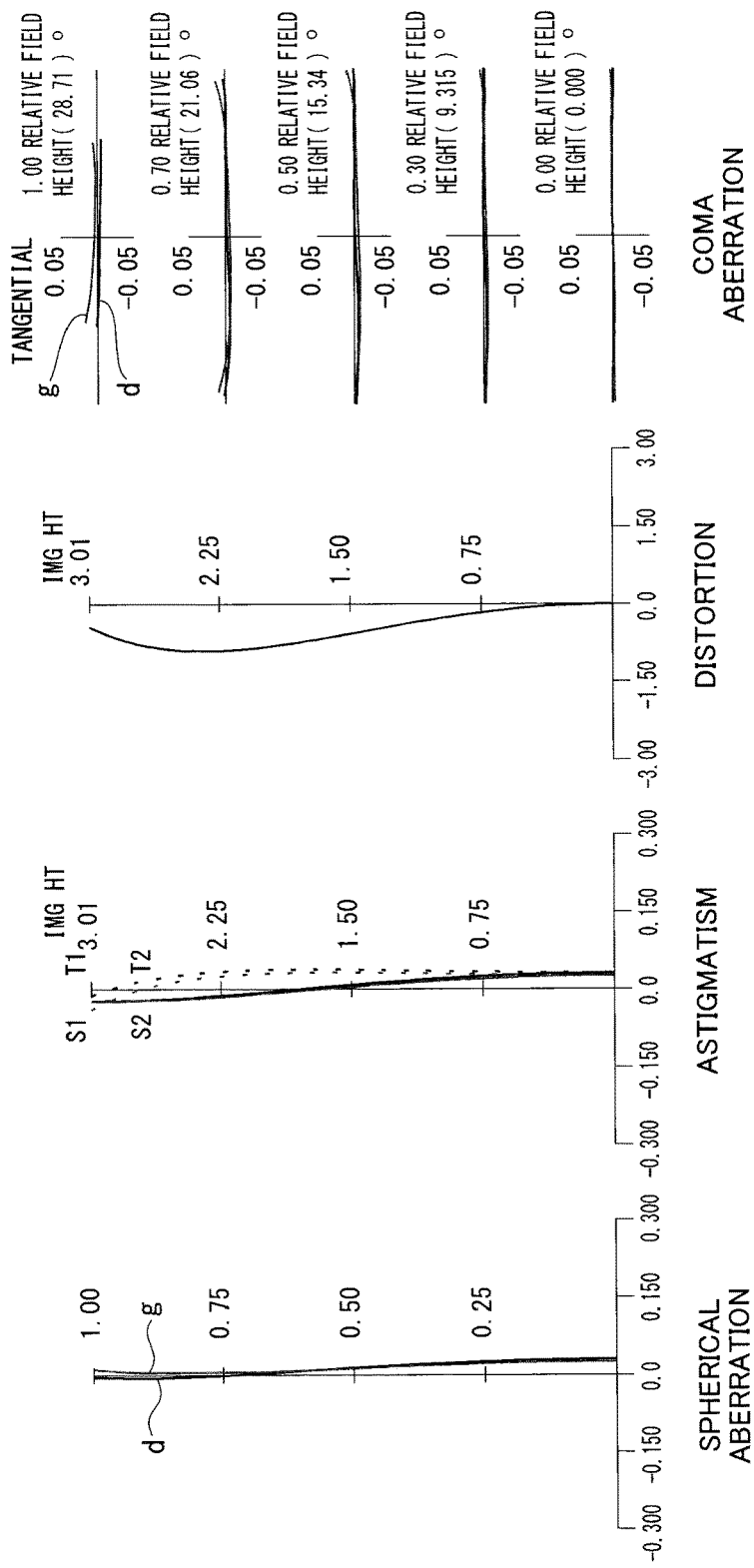
FIG. 7 shows aberration curves of the optical imaging system in FIG. 3 according to the third embodiment.

The fourth and fifth lenses L4 and L5 are a cemented lens closely adhered to each other. A filter F as parallel plate is provided behind the second lens group 2G and a cover glass CG is provided on the image plane side of the filter F. FIG. 7 shows curves of spherical aberration, astigmatism, distortion, and coma aberration on d-line and g-line when the optical imaging system according to the third embodiment focuses on an object at infinity. According to the second embodiment the focal length f, F-number Fno, and half angle of view ω are f=5.51, Fno=2.1, ω=28.7, respectively. The optical properties of the respective optical elements such as curvature radius γ of lens surface, interval d between neighboring lens surfaces, refractive index Nd, and Abbe number vd are shown in the following Table 3.

TABLE 3

| FACE NUMBER | r | d | Nd | vd |
|---|---|---|---|---|
| 1 | 10.793 | 2.22 | 1.7447 | 43.1 |
| 2 | 40.240 | 1.00 | | |
| 3 | 5.854 | 1.20 | 1.6204 | 60.3 |
| 4 | 2.238 | 1.40 | | |
| 5 | 24.979 | 2.40 | 1.7552 | 27.6 |
| 6 | −50.000 | 0.20 | | |
| 7 | — | 0.30 | | |
| 8 | −5.197 | 1.40 | 1.7552 | 27.6 |
| 9 | 7.451 | 1.91 | 1.6204 | 60.3 |
| 10 | −4.337 | 0.40 | | |
| 11 | 45.233 | 1.60 | 1.6204 | 60.3 |
| 12 | −7.619 | 0.20 | | |
| 13 | 9.881 | 1.43 | 1.6204 | 60.3 |
| 14 | 50.000 | 2.30 | | |
| 15 | ∞ | 1.50 | 1.5163 | 64.1 |
| 16 | ∞ | 0.64 | | |
| 17 | ∞ | 0.40 | 1.5163 | 64.1 |
| 18 | ∞ | 1.50 | | |

The specific values of the above conditions (1) to (4) are as follows:
Condition (1): f1F/f = 3.48
Condition (2): f1R/f = −1.89
Condition (3): f2F/f = 8.21
Condition (4): L/f = 3.99

These values are within the respective ranges defined in the conditions.

Fourth Embodiment

Figure 4:
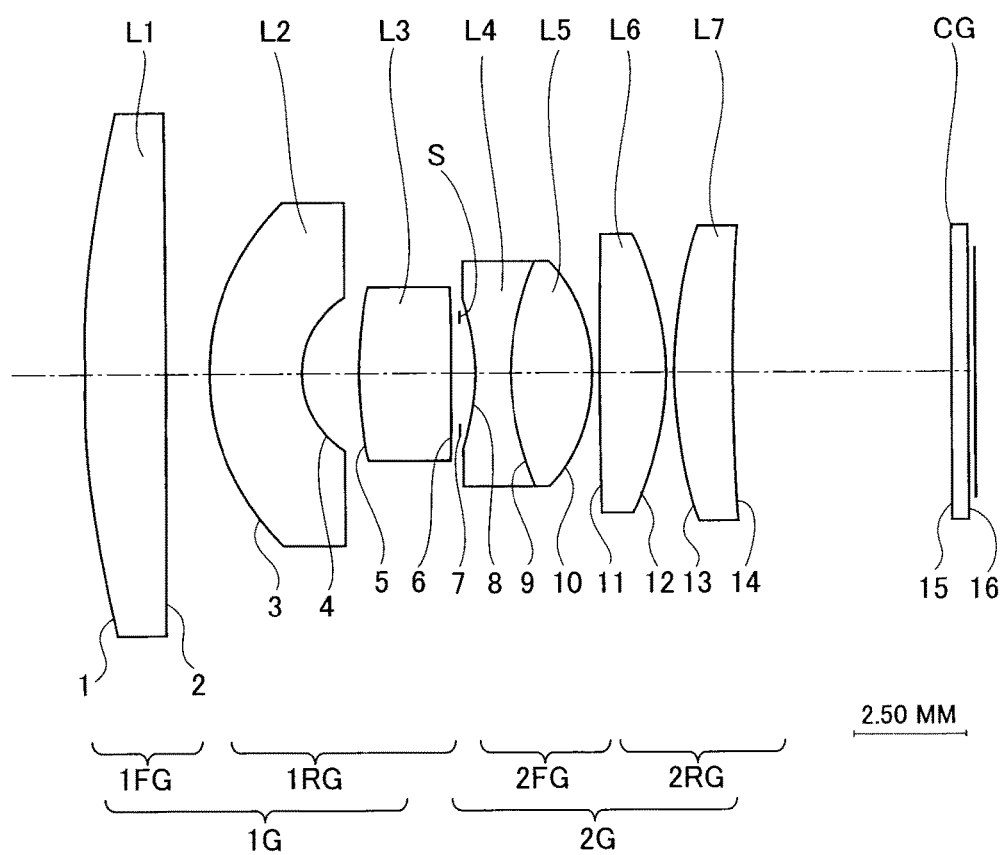
FIG. 4 shows the arrangement of an optical imaging system according to a fourth embodiment.
Figure 5:
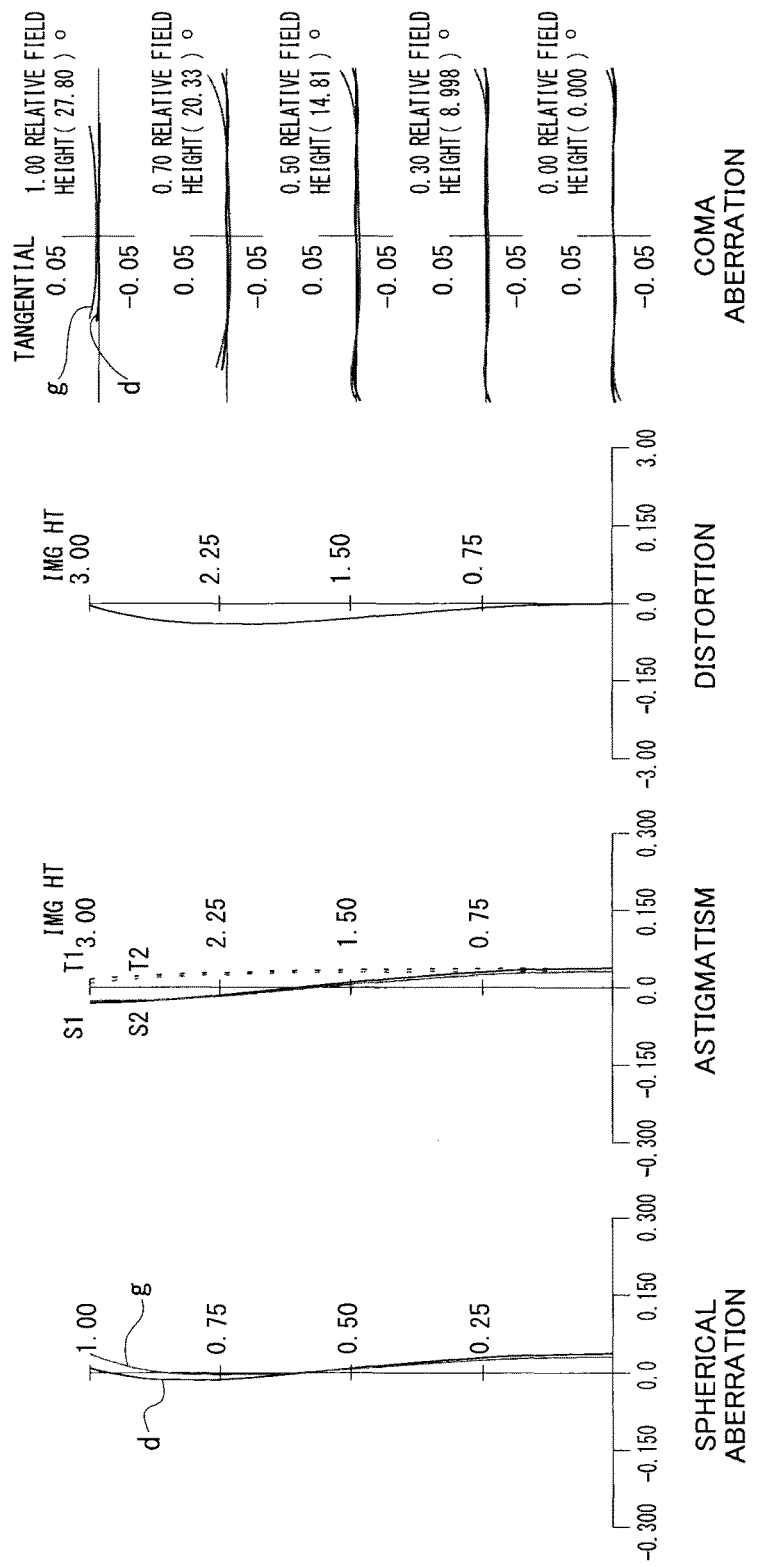
FIG. 5 shows aberration curves of the optical imaging system in FIG. 1 according to the first embodiment.

FIG. 4 shows the optical arrangement of the image forming lens according to the fourth embodiment. The image forming lens in FIG. 4 includes first to third lenses L1 to L3, an aperture stop S, and fourth to seventh lenses L4 to L7 arranged in order from an object side to an image plane side. The fourth and fifth lenses L4, L5 are a cemented lens. The image forming lens is comprised of six groups and seven lenses. The first to third lenses L1 to L3 are a first lens group 1G. The fourth to seventh lenses L4 to L7 are a second lens group 2G. The first lens L1 is a first front lens group 1FG having positive refractive power. The second and third lenses L2, L3 are a first rear lens group 1RG having negative refractive power. The fourth and fifth lenses L4, L5 are a second front lens group 2FG having positive refractive power. The sixth and seventh lenses L6, L7 are a second rear lens group 2RG having positive refractive power.

Thus, the first front and rear lens groups 1FG, 1RG, aperture stop S, and the second front and rear lens groups 2FG, 2RG are arranged in order from the object side to the image plane side. In the first lens group 1G the first lens L1 is a positive bi-convex lens having a larger curvature on the object side than the image plane side, the second lens L2 having a negative meniscus lens having a convex surface on the object side, and the third lens L3 is a positive bi-convex lens having a larger curvature on the object side than the image plane side, to exert a negative refractive power. The aperture stop S is disposed between the first and second lens groups 1G and 2G. In the second lens group 2G the fourth lens L4 is a negative bi-concave lens having a larger curvature on the object side than the image plane side, the fifth lens L5 is a positive bi-convex lens having a larger curvature on the image plane side than the object side, the sixth lens L6 is a positive bi-convex lens having a larger curvature on the image plane side than the object side, and the seventh lens L7 is a positive meniscus lens having a convex surface on the object side, to exert positive refractive power.

Figure 8:
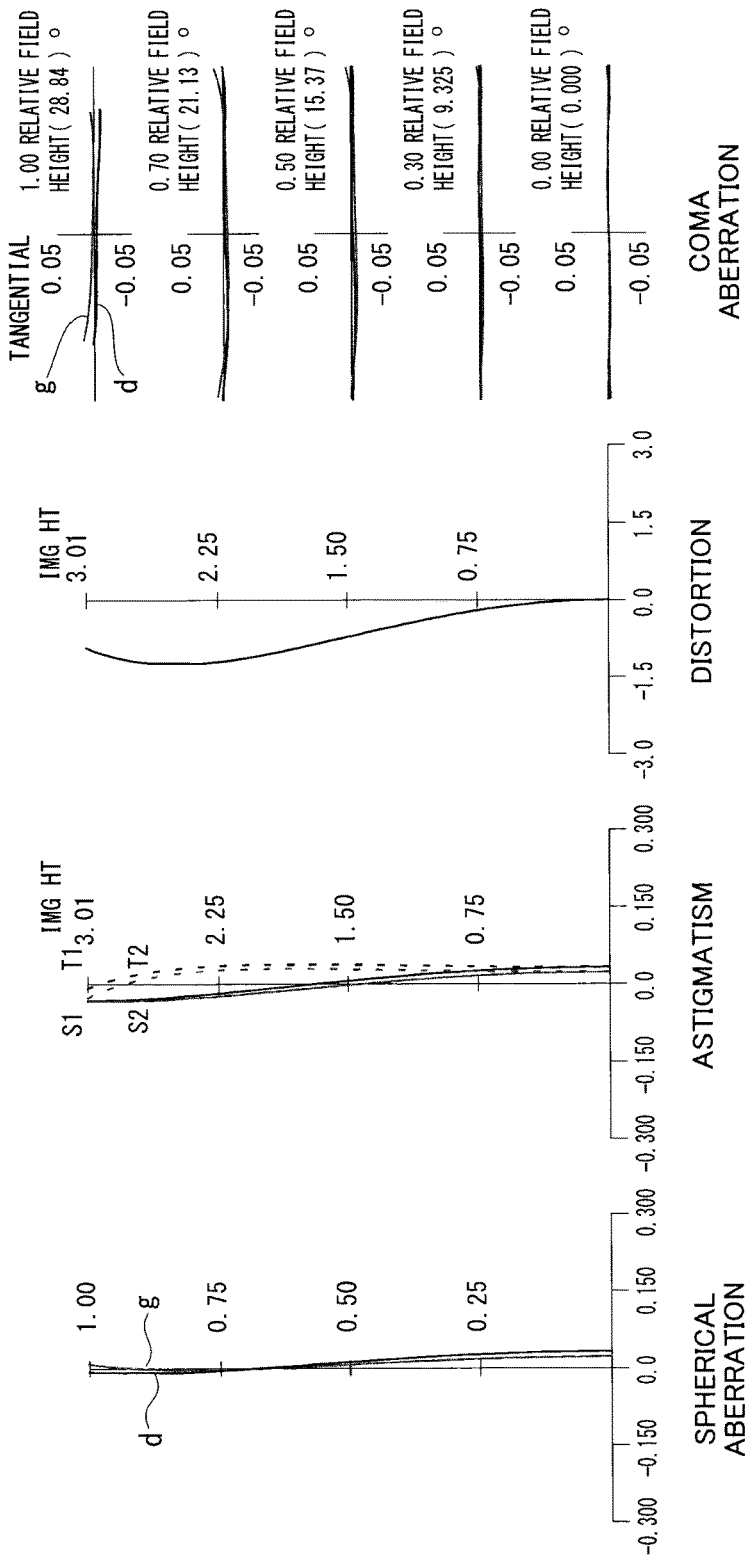
FIG. 8 shows aberration curve of the optical imaging system in FIG. 4 according to the fourth embodiment.

The fourth and fifth lenses L4 and L5 are a cemented lens closely adhered to each other. A cover glass CG is provided immediately before the image plane behind the second lens group 2G. FIG. 8 shows curves of spherical aberration, astigmatism, distortion, and coma aberration on d-line and g-line when the optical imaging system according to the fourth embodiment focuses on an object at infinity. According to the fourth embodiment the focal length f, F-number Fno, and half angle of view ω are f=5.51, Fno=2.2, ω=28.8, respectively. The optical properties of the respective optical elements such as curvature radius γ of lens surface, interval d between neighboring lens surfaces, refractive index Nd, and Abbe number vd are shown in the following Table 4.

TABLE 4

| FACE NUMBER | r | d | Nd | vd |
|---|---|---|---|---|
| 1 | 26.041 | 1.90 | 1.6655 | 32.4 |
| 2 | −472.010 | 1.03 | | |
| 3 | 5.495 | 2.23 | 1.7440 | 44.9 |
| 4 | 2.185 | 1.33 | | |
| 5 | 12.444 | 2.14 | 1.7542 | 28.6 |
| 6 | −50.000 | 0.20 | | |
| 7 | — | 0.35 | | |
| 8 | −5.939 | 0.87 | 1.7552 | 27.6 |
| 9 | 6.493 | 1.91 | 1.6204 | 60.3 |
| 10 | −3.965 | 0.20 | | |
| 11 | 187.746 | 1.56 | 1.6204 | 60.3 |
| 12 | −7.226 | 0.20 | | |
| 13 | 10.787 | 1.37 | 1.6204 | 60.3 |
| 14 | 50.000 | 5.16 | | |
| 15 | ∞ | 0.40 | 1.5163 | 64.1 |
| 16 | ∞ | 0.15 | | |

The specific values of the above conditions (1) to (4) are as follows:
Condition (1): f1F/f = 6.74
Condition (2): f1R/f = −2.70
Condition (3): f2F/f = 4.07
Condition (4): L/f = 3.81

These values are within the respective ranges defined in the conditions.

Fifth Embodiment

Figure 9:
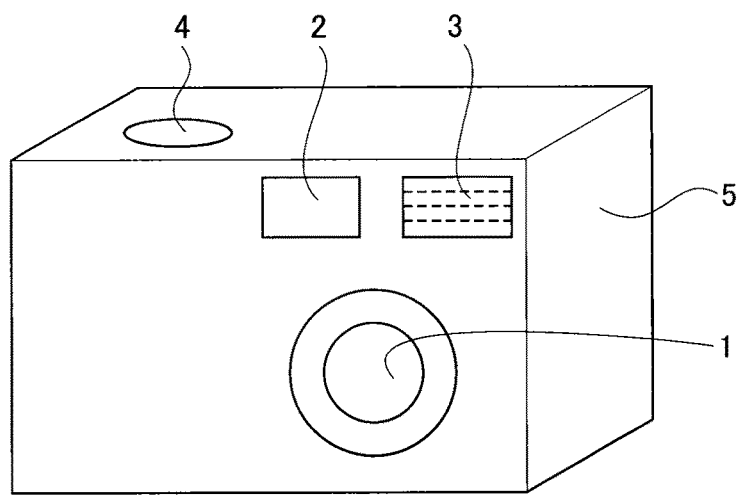
FIG. 9 is a perspective view of a front side of a digital camera according to a fifth embodiment as seen from an object.
Figure 10:
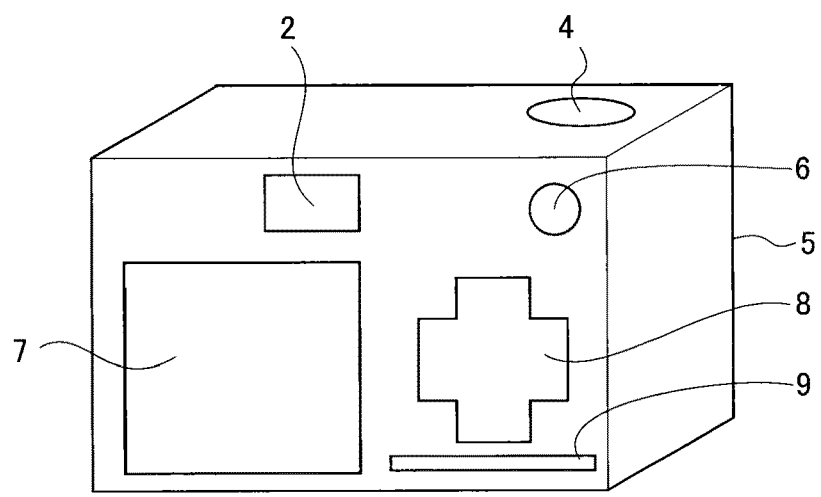
FIG. 10 is a perspective view of a back side of the digital camera in FIG. 9 as seen from a photographer.
Figure 11:
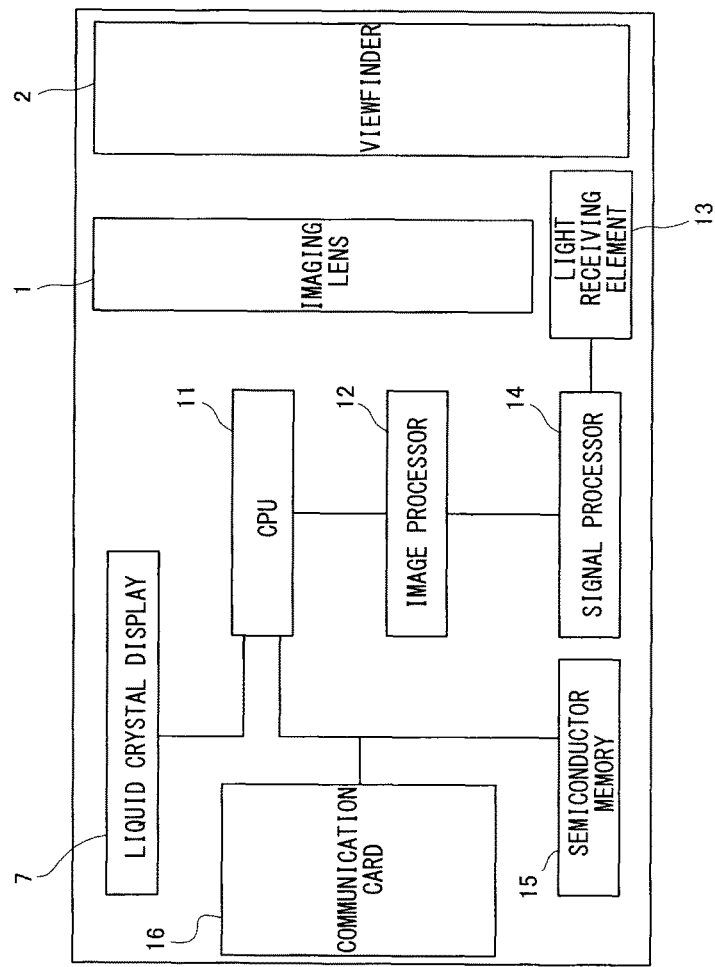
FIG. 11 is a block diagram of the functions of the digital camera in FIG. 9 and FIG. 10.

Next, a digital camera as an example of a camera or an in-vehicle camera incorporating the imaging optical system of any of the first to fourth embodiments is described referring to FIG. 9 to FIG. 11. FIG. 9 shows a front side of the digital camera as seen from a subject and FIG. 10 is a view of a back side of the same as seen from a photographer. FIG. 11 is a function block diagram of the structure of the digital camera. Herein, a digital camera is exemplified as a camera, however, the optical imaging system according to any of the above embodiments can be adopted to a silver-salt film camera, and it is suitable for an in-vehicle camera, a security camera, and a monitoring camera for manufacturing line which require high resolution, low distortion, wide angle of view, and a large diameter. Further, an information device or mobile data terminal device such as PDA (personal data assistant) or mobile phone incorporating a camera function has been popular. Such a device has a different outer appearance but it is structured and functions same as a digital camera. The imaging optical system is also applicable to such an information device.

Referring to FIGS. 9 to 11, the digital camera includes an imaging lens 1 as optical imaging system, a viewfinder 2, a strobe light 3, a shutter button 4, a camera body 5, a power switch 6, a liquid crystal display 7, an operation button 8, and a memory card slot 9. Further, it includes a CPU 11, an image processor 12, a light receiving element 13, a signal processor 14, a semiconductor memory 15, and a communication card 16. The light receiving element 13 is an image sensor such as CMOS (complementary metal-oxide semiconductor) or CCD (charge-coupled device). An optical image of a subject formed by the imaging lens 1 is read with the light receiving element 13. The imaging lens 1 is the optical imaging system according to any of the first to fourth embodiments. The signal processor 14 is controlled by the CPU 11 to convert the output of the light receiving element 13 to digital image information. The light receiving element 13, signal processor, and CPU 11 controlling both elements function to convert a subject image to digital image data.

Under the control of the CPU, the image processor 12 performs certain image processing to the digital image data processed by the signal processor 14. Then, the image data is stored in the semiconductor memory as a non-volatile memory. The semiconductor memory 15 can be a memory card mounted in the memory card slot 9 or one incorporated in the camera body. The liquid crystal display 7 can display an image being captured or an image stored in the semiconductor memory 15. Stored images can be transmitted from the semiconductor memory 15 to outside via the communication card 16 mounted in a not-shown slot. The object plane of the imaging lens 1 is covered with a not-shown lens barrier during non-use. When a user presses the power switch 6, the lens barrier is opened to expose the object plane. A user manipulates the operation button 8 in a predetermined manner to display an image on the LCD 7 or transmit an image to outside from the semiconductor memory 15 via the communication card 16. The semiconductor memory 15 and the communication card 16 are mounted in dedicated or general-purpose slots.

The digital camera or in-vehicle camera incorporating the optical imaging system according to one of the first to fourth embodiments can realize a half angle of view of 30 degrees or more, a large diameter of F-number 2.0 or less, a low distortion of about 1.0% and high image quality.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An optical imaging system having a single focus, comprising:
   a negative first lens group, an aperture stop, and a positive second lens group arranged in order from an object side,
   the first lens group comprising a positive first front lens group including a positive single lens and a negative first rear lens group including a negative meniscus lens and at least one positive lens, arranged in order from the object side, and
   the second lens group comprising a positive second front lens group including a cemented lens of a negative lens and a positive lens and a positive second rear lens group including at least one positive lens, arranged in order from the object side, wherein
   all of the lenses of the optical imaging system are spherical glass lenses,
   the first lens group is configured to satisfy the following conditions:

$$2.5 < f1F/f < 7.1 \quad (1)$$

$$-3.7 < f1R/f < -0.8 \quad (2)$$

where f is a focal length of the entire system relative to a d-line, f1F is a focal length of the first front lens group, and f1R is a focal length of the first rear lens group,
   the second front lens group is configured to satisfy the following condition:

$$2.0 < f2F/f < 12.64.09 \quad (3)$$

where f is the focal length of the entire system relative to the d-line and f2F is a focal length of the second front lens group, and
   the optical imaging system is configured to satisfy the following condition:

$$2.9 < L/f < 4.0 \quad (4)$$

where f is the focal length of the entire system relative to the d-line and L is a distance between a lens surface of the positive single lens of the first lens group on the object side and an image plane.

2. The optical imaging system according to claim 1, wherein:
   the first lens group includes the positive single lens having a convex surface on the object side, the negative meniscus lens having a convex surface on the object side, and a positive lens having a convex surface on the object side arranged in order from the object side.

3. The optical imaging system according to claim 1, wherein:
   the cemented lens of the second front lens group has a concave surface on the object side and a convex surface on an image side.

4. The optical imaging system according to claim 1, wherein
   the second rear lens group includes a positive meniscus lens having a convex surface on the image side and a positive lens having a convex surface on the object side.

5. A camera comprising the optical imaging system according to claim 1.

6. The camera according to claim 5, further comprising a function to convert a captured image into digital information.

7. An in-vehicle camera comprising the optical imaging system according to claim 1.

8. The optical imaging system according to claim 1, further comprising a cover glass provided behind the second lens group in order from the object side.

9. The optical imaging system according to claim 8, further comprising
   a filter provided between the second lens group and the cover glass.

\* \* \* \* \*